United States Patent [19]

Schweizer

[11] 4,295,623
[45] Oct. 20, 1981

[54] VARIABLE POSITION ARTICLE HOLDER

[75] Inventor: Eduard H. Schweizer, Dusseldorf, Fed. Rep. of Germany

[73] Assignee: Investment Rarities, Inc., Bloomington, Minn.

[21] Appl. No.: 11,280

[22] Filed: Feb. 12, 1979

[51] Int. Cl.³ .......................... A47F 5/12; A47G 1/24
[52] U.S. Cl. ...................................... 248/456; 211/81; 211/170; 211/175; 248/454
[58] Field of Search ................... 211/2, 49 R, 40, 43, 211/80, 81, 150, 168, 170, 175, 195, 198, 200; 248/286, 371, 397, 447, 454, 455, 456, 457

[56] References Cited

U.S. PATENT DOCUMENTS

| 743,048 | 11/1903 | Suffern | 248/455 |
| 1,086,906 | 2/1914 | Felten | 248/456 |
| 2,017,518 | 10/1935 | Wagner | 248/456 |
| 2,041,017 | 5/1936 | Pennington | 248/455 |
| 2,062,553 | 12/1936 | Campos | 248/456 X |
| 2,374,409 | 4/1945 | Brennan | 248/456 X |
| 2,860,439 | 11/1958 | Johnson | 211/195 |
| 3,385,453 | 5/1968 | Dantino et al. | 211/75 |
| 3,726,412 | 4/1973 | Resnicoff | 211/195 X |
| 3,784,021 | 1/1974 | Mark | 211/175 X |
| 4,116,413 | 9/1978 | Anderson | 248/455 X |

FOREIGN PATENT DOCUMENTS

| 413756 | 5/1946 | Italy | 248/454 |
| 451365 | 8/1936 | United Kingdom | 248/457 |

Primary Examiner—Thomas J. Holko
Attorney, Agent, or Firm—Wicks & Nemer

[57] ABSTRACT

A variable position article holder according to the teachings of the present invention is shown in the preferred embodiment for holding boxes for recording tapes such as cassette, 8-track, or video tape. The tape holder includes first and second L-shaped members. The second L-shaped member can be interfitted within an L-shaped aperture formed in the first L-shaped member. The second L-shaped member is slidably and pivotably mounted to the first L-shaped member within the aperture by detents which extend from the second L-shaped member into slots formed in the leg portions of the first L-shaped member adjacent the aperture. A washboard series of angular peaks are formed on the top surface of the second leg of the second L-shaped member. The first L-shaped member further includes ratchet levers which extend into the aperture and engage with the angular peaks of the second L-shaped member. Thus, the first L-shaped member can be held in any desired angular position with respect to the second L-shaped member by the ratchet levers which engage one of the angularpeaks and by the detents which are slidably and pivotally captured in the slots. Further, in one of the angular positions, the second L-shaped member is located within the L-shaped aperture of the first L-shaped member such that the tape holder has a single overall outline.

45 Claims, 4 Drawing Figures

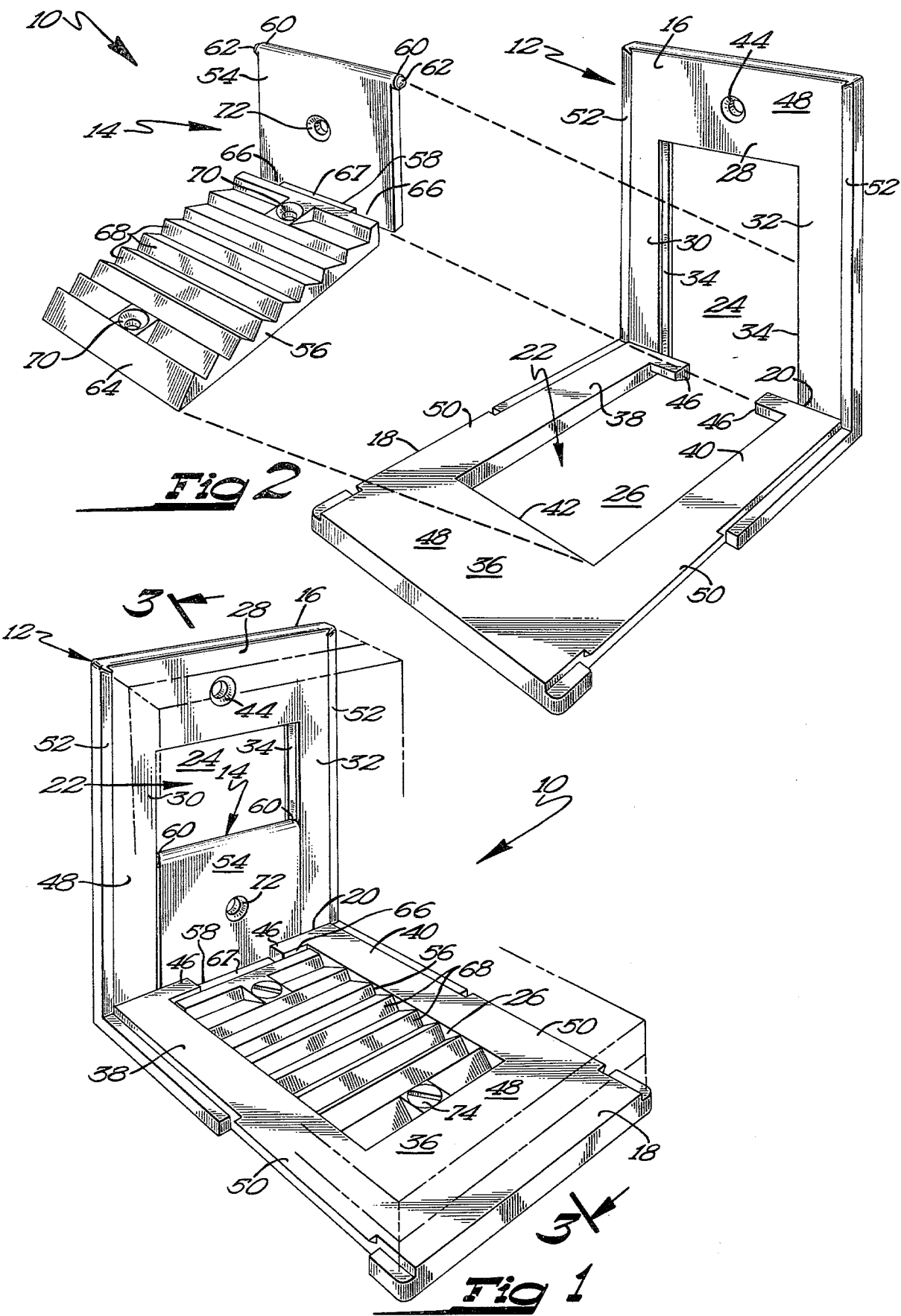

VARIABLE POSITION ARTICLE HOLDER

BACKGROUND

The present invention relates generally to variable position article holders and more specifically to variable position tape holders.

With the increasing interest in use of cassette, 8-track, or video tape systems, a need has arisen for a holder for holding tape boxes. Specifically, a need has arisen for a holder allowing easy access to the tapes within the boxes and also holding the boxes at the desired angle. The holder should be adaptable to any support surface of whatever angle, such as a horizontal surface, a vertical surface, or the console of an automobile, with the tapes held at the desired angle to the particular height and comfort of the person removing the tapes therefrom.

SUMMARY

The present invention solves these and other needs by providing a variable position article holder including first and second members of similar outlines. One of the first and second members supports the article. The first and second members are interrelated for supporting the member which holds the article in any one of serveral angular positions.

It is thus an object of the present invention to provide a novel variable position article holder.

It is further an object of the present invention to provide a novel variable position tape holder.

It is further an object of the present invention to provide such novel holder for holding the article in any one of several angular positions.

It is further an object of the present invention to provide such novel article holders having a single overall outline in a first angular relationship.

These and further objects and advantages of the present invention will become clearer in the light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows a perspective view of a variable position tape holder constructed according to the teachings of the present invention in its first relationship having a single overall outline and including tape boxes shown in two possible positions in phantom.

FIG. 2 shows an exploded perspective view of the tape holder of FIG. 1.

Figure 3:
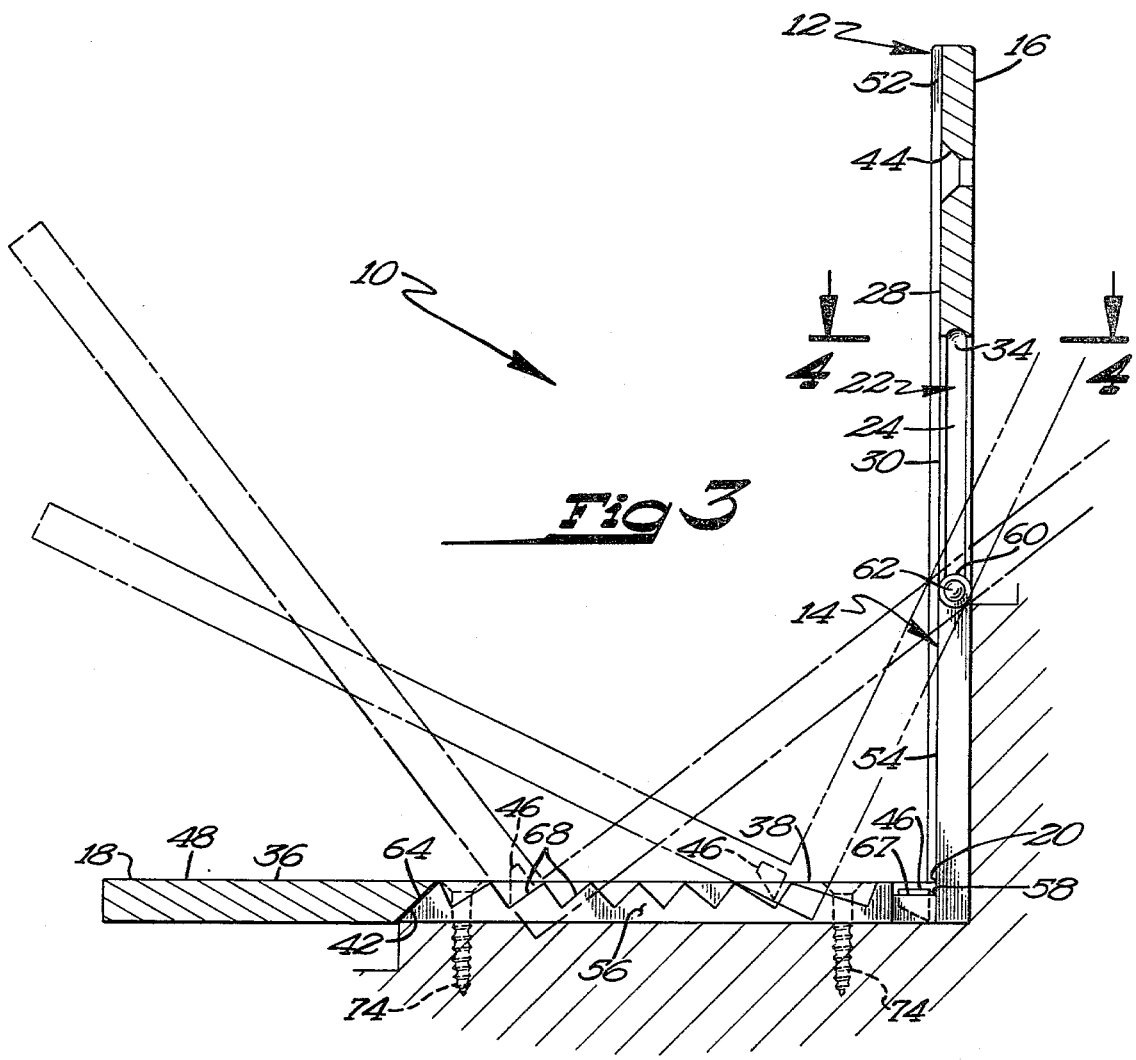
FIG. 3 shows a cross sectional view taken along section line 3—3 of FIG. 1 including phantom views of the article holder in other angular positions.
Figure 4:
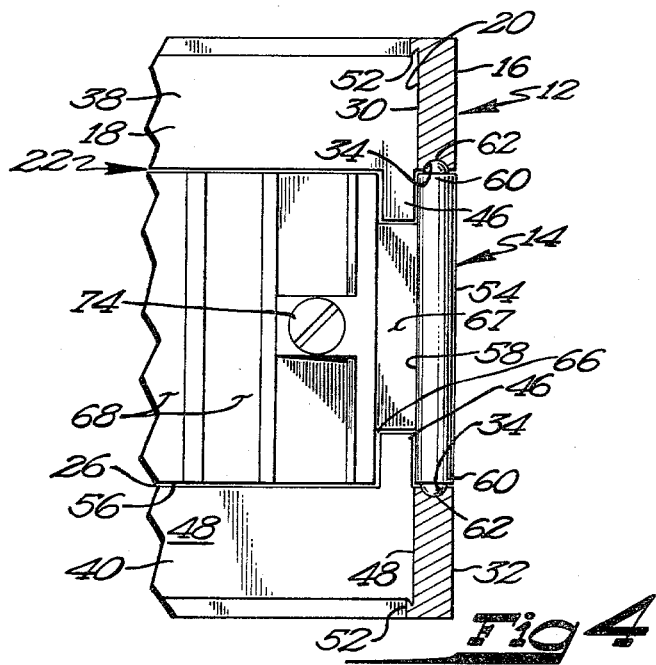
FIG. 4 shows a cross sectional view of the tape holder of FIG. 1 taken along section line 4—4 of FIG. 3.

All figures are drawn for ease of explanation of the basic teachings of the present invention only; the extensions of the figures with respect to number, position, relationship, and dimensions of the parts to form preferred embodiment will be explained or will be obvious to those skilled in the art from the explanation given.

Where used in the various figures of the drawings, the same numerals designate the same or similar parts. Furthermore, when the terms "first", "second", "inside", "top", and similar terms are used herein, it should be understood that these terms have reference only to the structure shown in the drawings as it would appear to a person viewing the drawings and are utilized only to facilitate describing the invention.

DESCRIPTION

In the figures, a variable position article holder constructed according to the teachings of the present invention is shown in the preferred embodiment, for holding boxes for recording tapes such as cassette, 8-track, or video tape and is generally designated 10. Holder 10 generally includes a first L-shaped member 12 and a second, interfitting, L-shaped member 14.

Member 12 includes a first upstanding leg 16 and a second outstanding leg 18 which are interconnected to each other at and extend from junction or corner 20. In the preferred embodiment, the angle of corner 20 is 90°, or in other words, legs 16 and 18 are perpendicular to each other.

Member 12 further includes an L-shaped opening or aperture 22 formed therein having a shape corresponding to and for receiving member 14. Specifically, opening 22 includes a first rectangular shaped opening 24 formed in leg 16 and a second rectangular shaped opening 26 formed in leg 18. Openings 24 and 26 are also interconnected to each other at and extend from a line across junction 20.

Thus, leg 16 is U-shaped and includes a central portion 28 across the top thereof and two vertically arranged leg portions 30 and 32 depending from central portion 28. Slots 34 are formed in the inside surfaces of leg portions 30 and 32 of leg 16 or, in other words, the surfaces facing aperture 24 and each other. Similarly, leg 18 is U-shaped and includes a central portion 36 across the top thereof and two vertically arranged leg portions 38 and 40 depending from central portion 36. As best seen in FIG. 3, inside edge 42 of central portion 36 is slanted. Thus, leg portion 30 of leg 16 is interconnected to leg portion 38 of leg 18 and leg portion 32 of leg 16 is interconnected to leg portion 40 of leg 18, all at junction 20.

An aperture 44, which may be countersunk, as shown, can be formed in central portion 28 of leg 16 for receiving a suitable mounting screw.

First and second arms, projections, interfitting or engaging members, or rachet levers 46 extend toward each other from the ends of leg portions 38 and 40 of leg 18 and into aperture 26 along corner 20 thus giving leg 18 a C-shape. In the preferred embodiment, levers 46 are angular shaped as best seen in FIG. 2.

Member 12 then holds at least one article, for example recording tape of either cassette, 8-track, or video types. Specifically, inside surface 48 of legs 16 and 18 of member 12 may support such articles. Further, member 12 may include suitable members for attaching or holding the article thereto. In the preferred embodiment, the outside edges of leg portions 38 and 40 of leg 18 include first slidable interconnect members 50 for slidably interconnecting with corresponding interconnect members formed on the article to be held such as the tape boxes shown in phantom in FIG. 1 horizontally interconnected to members 50. Similarly, outside edges of leg portions 30 and 32 of leg 16 include second slidable interconnect members 52 for slidably interconnecting with corresponding interconnect members formed on the article to be held such as the tape boxes shown in phantom in FIG. 1 vertically interconnected to members 52. Thus, the article can be slidably interconnected with either member 50 or 52 or with both and held on surface 48.

Member 14 includes a first upstanding leg 54 and a second outstanding leg 56 which are interconnected to each other at and extend from junction or corner 58. In the preferred embodiment, the angle of corner 58 is 90°, or in other words, legs 54 and 56 are perpendicular to each other.

Detents 60, which may include detent balls 62, extend from the sides of member 14 and, in the preferred embodiment, along the end of leg 54 opposite corner 58. As best seen in FIG. 3, detents 60 and balls 62 are slidably and pivotably received in slots 34 of leg portions 30 and 32 of member 12 for purposes to be explained further hereinafter.

The edge of end 64 of leg 56 of member 14, opposite corner 58, is slanted corresponding to edge 42 of member 12. Additionally, openings 66 are formed in leg 56 along corner 58 of member 14 having a shape complementary to and for receiving levers 46 of member 12. Leg 56 is attached to leg 54 by a neck 67 created in leg 56 by openings 66.

The top or inside surface of leg 56 of member 14 includes a plurality or series of angular support positions shown as a washboard series of angular peaks or ridges 68 which form a ratchet gear for engagement with levers 46 of member 12 for purposes to be explained further hereinafter. Apertures 70 formed in leg 56 and/or aperture 72 formed in leg 54 of member 14, which may be countersunk as shown, can be provided for receiving suitable mounting screws.

Now that the basic construction of a preferred embodiment of holder 10 has been explained, the subtlety of the operation and other advantages of the present invention may be explained. It should first be noted that member 14 supports member 12 at any one of several angular positions or configurations as best seen in FIG. 3. Therefore, the article held in member 12 is held at any one of many desired angles for easy access thereto.

In the preferred embodiment, mounting screws 74 are passed through apertures 70 in leg 56 of member 14 and into the desired support surface for fixedly securing member 14 thereto. The support surface can be of various types of any angle and may include the upper or lower surface of a horizontal member such as a shelf, a vertical surface such as a wall, or the console in the interior of an automobile. Alternately or in addition to screws 74, suitable mounting screws, not shown, can be passed through aperture 72 in leg 54 of member 14 into the desired support surface for fixedly securing 14 thereto.

Member 14 can then be interfitted with member 12 in a first relationship such that member 14 is located in aperture 22 with detents 60 and balls 62 located in slots 34, levers 46 located within apertures 66, and edge 42 of member 12 abutting with edge 64 of member 14, the position shown in solid in FIGS. 1 and 3. Since members 12 and 14 are both L-shaped, and thus are substantially the same shape, when members 12 and 14 are interrelated and interfitted in this first relationship, holder 10 has a single overall outline, as best seen in solid in FIG. 3. Further, member 14 does not extend beyond the inside or support surface of member 12 such that member 14 does not interfere or abut with the article held in member 12. Likewise, holder 10 in the first relationship is very compact for packaging and shipping. Additionally, due to the interrelationship of members 12 and 14 in this first relationship, member 12 is prevented from moving below the level of member 14.

In addition to the first relationship, member 12 can be placed in any one of several other angular configurations, positions, or relationships with respect to member 14, corresponding to the number and location of ridges 68. Specifically, member 12 can be raised on member 14 such that detents 60 and balls 62 are slidably moved down slots 34, levers 46 are located outside of apertures 66, and edge 42 of member 12 is spaced from edge 64 of member 14. At that time, member 12 can be pivoted with member 14 about detents 60 which form the pivotal axis. Member 12 can then be positioned such that levers 46 engage with any one of ridges 68 which correspond with the desired angular position, as best seen by the two exemplary positions shown in phantom in FIG. 3. Thus, member 12 can be held in the desired angular position with respect to member 14 by levers 46 on member 12 which engage one of ridges 68 on member 14 and by detents 60 and balls 62 on member 14 which are slidably captured in slots 34 in member 12. Member 14 does not extend beyond the inside or support surface 48 of member 12 such that member 14 does not interfere or abut with the article held in member 12 in any of its angular positions.

Suitable mounting screws, not shown, can also be passed through aperture 44 to fixedly secure member 12 to the support surface at the desired angular relationship with member 14 if member 12 is desired to be held at a singular angular position rather than positioned in any one of the several angular positions.

If the tape boxes are slidably connected together to form a matrix of a plurality of boxes in rows and columns, it is only necessary to use two holders 10 constructed according to the teachings of the present invention located on the two outside rows for holding the entire matrix of tape boxes.

Now that the basic teachings of the present invention have been explained, many extensions and variations will be obvious to one having ordinary skill in the art. For example, although ridges 68 are shown in the preferred embodiment as extending all the way across the inside, support face of leg 56 of member 14 for ease of manufacture, it would be obvious to one skilled in the art to have ridges 68 extend from the edges of leg 56 only the length of levers 46 thus leaving a plateau portion in the middle of leg 56.

Further, it would be obvious to one skilled in the art, after the teachings of the present invention have been understood, to place ridges 68 on the bottom face, or in other words in the face opposite to the inside, support surface as shown in the figures of the preferred embodiment of the present invention. Further, it would then be necessary to reverse levers 46 to engage such reversed ridges. Further, apertures 66 would then not be required in member 14 in that levers 46 could fit into a ridge formed in member 14 corresponding to the position of member 12 and 14 as shown in FIG. 1. Thus, ridges 68 are then not visably accessible in normal use and the rachet levers may be captured in the ridges between the support surface and the leg of the L-shaped member to prevent the levers from being jarred out of the ridge, for example when the holder is used in an automobile traveling over rough terrain.

Similarly, the particular shapes, angles, spacings, and numbers of ridges 68 can be varied according to the desired number, location, and angular position of member 12 desired.

Likewise, although screws 74 are shown in the preferred embodiment for securing members 14 to the support surface, second L-shaped member 14 can be attached to the support surface by other securing means such as by glue, tape, or VELCRO brand fasteners.

Thus, since the invention disclosed herein may be embodied in other specific forms without departing from the spirit of the general characteristics thereof, some of which forms have been indicated, the embodiments described herein are to be considered in all respects illustrative and not restrictive. The scope of the invention is indicated by the appended claims, rather than by the foregoing description and all changes which come within the meaning and range of equivalency of the claims are intended to be embraced therein.

What is claimed is:

1. A variable position tape holder for holding cassette, 8-track, or video tape boxes comprising, in combination: a first L-shaped member for holding at least one tape box and including first and second legs, a second L-shaped member including first and second legs, with the first L-shaped member including an L-shaped aperture of a shape and size corresponding to and for receiving the second L-shaped member such that the first leg of the first L-shaped member is U-shaped and includes a central portion and first and second leg portions and the second leg of the first L-shaped member is also U-shaped and includes a central portion and first and second leg portions, with the ends of the leg portions of the first and second legs of the first L-shaped member being joined together forming a corner, with the inside surfaces of the first and second leg portions of the first leg of the first L-shaped member including longitudinal slots, with the second leg of the second L-shaped member including a series of angular support positions comprising a washboard series of angular peaks, with the first L-shaped member including means for engaging with the angular support positions comprising ratchet levers extending from the ends of the first and second leg portions of the second leg of the first L-shaped member into the aperture along the corner, thus giving the second leg of the first L-shaped member a C-shape, and means for slidably and pivotally mounting the first leg of the first L-shaped member to the first leg of the second L-shaped member comprising detents extending along the end of the first leg of the second L-shaped member which extend into the slots of the first L-shaped member for slidable and pivotal movement therein allowing the first L-shaped member to be slid and pivoted with respect to the second L-shaped member allowing the ratchet levers to engage with one of the angular support positions to thereby hold the first L-shaped member in any one of several angular positions.

2. The tape holder of claim 1 wherein the first and second L-shaped members can be interrelated in a first relationship with the second L-shaped member interfitting within the aperture to form an article holder with a single overall outline.

3. The tape holder of claim 2 wherein the angular support positions are formed on the top surface of the second leg of the second L-shaped member.

4. The tape holder of claim 3 wherein the second L-shaped member includes apertures formed in the second leg of the second L-shaped member for receiving the rachet levers of the first L-shaped member when the first and second L-shaped members are in the first relationship.

5. The tape holder of claim 2 or 4 wherein the end of the secon leg of the second L-shaped member is slanted and wherein the inside edge of the central portion of the second leg of the first L-shaped member is slanted corresponding with the end of the second leg of the second L-shaped member and for abutting therewith in the first relationship for preventing the first L-shaped member from moving below the level of the second L-shaped member.

6. The tape holder of claim 1 or 4 wherein the first leg of the first L-shaped member is perpendicular to the second leg of the first L-shaped member and wherein the first leg of the second L-shaped member is perpendicular to the second leg of the second L-shaped member.

7. The tape holder of claim 1 wherein the first L-shaped member includes means for slidably interconnecting with the tape box.

8. The tape holder of claim 1 wherein the angular support positions are formed on the top surface of the second leg of the second L-shaped member.

9. A variable position tape holder for holding cassette, 8-track, or video tape boxes comprising, in combination: a first L-shaped member for holding at least one tape box and including first and second legs; a second L-shaped member including first and second legs; and means for interrelating the first and second L-shaped members for supporting the first L-shaped member in any one of several angular positions, wherein the interrelating means includes means for both slidably and pivotably interrelating the first L-shaped member to the second L-shaped member at the same location.

10. The tape holder of claim 9 wherein the first L-shaped member further includes an L-shaped aperture such that the first leg of the first L-shaped member is U-shaped and includes a central portion and first and second leg portions and the second leg of the first L-shaped member is also U-shaped and includes a central portion and first and second leg portions, with the ends of the leg portions of the first and second legs of the first L-shaped member being joined together forming a corner.

11. A variable position tape holder for holding cassette, 8-track, or video tape boxes comprising, in combination: a first L-shaped member for holding at least one tape box and including first and second legs; a second L-shaped member including first and second legs; and means for interrelating the first and second L-shaped members for supporting the first L-shaped member in any one of several angular positions, wherein the interrelating means includes means for slidably and pivotably interrelating the first L-shaped member to the second L-shaped member, wherein the first L-shaped member further includes an L-shaped aperture such that the first leg of the first L-shaped member is U-shaped and includes a central portion and first and second leg portions and the second leg of the first L-shaped member is also U-shaped and includes a central portion and first and second leg portions, with the ends of the leg portions of the first and second legs of the first L-shaped member being joined together forming a corner, wherein the slidably and pivotally interrelating means comprises, in combination: longitudinal slots formed on the inside surfaces of the first and second leg portions of the first leg of the first L-shaped member; and detents extending along the end of the first leg of the second L-shaped member which extend into the slots of the first L-shaped member for slidable and pivotable movement therein allowing the first L-shaped member to be slidable and pivotable with respect to the second L-shaped member.

12. The tape holder of claim 11 wherein the interrelating means includes: a series of angular support positions formed on the second leg of the second L-shaped member; and means formed on the first L-shaped member for engaging with the angular support positions for holding the first L-shaped member in any one of several angular positions.

13. The tape holder of claim 12 wherein the angular support positions comprise a series of angular peaks and wherein the engaging means comprises arms extending from the first L-shaped member into the aperture for engaging with and resting in between the angular peaks of the second L-shaped member.

14. The tape holder of claim 13 wherein the series of angular peaks are formed on the top surface of the second leg of the second L-shaped member.

15. The tape holder of claim 13 wherein the arms extend from the ends of the first and second leg portions of the second leg of the first L-shaped member into the aperture along the corner thus giving the second leg of the first L-shaped member a C-shape.

16. The tape holder of claim 15 wherein the first and second L-shaped members can be interrelated in a first relationship with the second L-shaped member interfitting within the aperture to form an article holder of a single overall outline.

17. The tape holder of claim 16 wherein the second L-shaped member includes apertures formed in the second leg of the second L-shaped member for receiving the arms of the first L-shaped member when the first and second L-shaped members are in the first relationship.

18. The tape holder of claim 16 or 17 wherein the end of the second leg of the second L-shaped member is slanted and wherein the inside edge of the central portion of the second leg of the first L-shaped member is slanted corresponding with the end of the second leg of the second L-shaped member and for abutting therewith in the first relationship for preventing the first L-shaped member from moving below the level of the second L-shaped member.

19. A variable position tape holder for holding cassette, 8-track, or video tape boxes comprising, in combination: a first L-shaped member for holding at least one tape box and including first and second legs and having an L-shaped outline; a second L-shaped member including first and second legs and having an L-shaped outline; and means for interrelating the first and second L-shaped members for supporting the first L-shaped member in any one of several angular positions, wherein the first and second L-shaped members can be interrelated in a first relationship to form an article holder of a single overall outline being the same as the outline of the first or second L-shaped members.

20. The tape holder of claim 9 or 19 wherein the first L-shaped member includes means for slidably interconnecting with the tape box.

21. The tape holder of claim 19 wherein the first L-shaped member further includes an L-shaped aperture such that the first leg of the first L-shaped member is U-shaped and includes a central portion and first and second leg portions and the second leg of the first L-shaped member is also U-shaped and includes a central portion and first and second leg portions, with the ends of the leg portions of the first and second legs of the first L-shaped member being joined together forming a corner.

22. The tape holder of claim 21 wherein the aperture is of a shape and size corresponding to and for receiving the second L-shaped member wherein in the first relationship the second L-shaped member interfits within the aperture.

23. The tape holder of claim 22 wherein the end of the second leg of the second L-shaped member is slanted and wherein the inside edge of the central portion of the second leg of the first L-shaped member is slanted corresponding with the end of the second leg of the second L-shaped member and for abutting therewith in the first relationship for preventing the first L-shaped member from moving below the level of the second L-shaped member.

24. The tape holder of claim 22 wherein the first leg of the first L-shaped member is perpendicular to the second leg of the first L-shaped member and wherein the first leg of the second L-shaped member is perpendicular to the second leg of the second L-shaped member.

25. The tape holder of claim 21 or 22 wherein the interrelating means includes means for slidably and pivotably interrelating the first L-shaped member to the second L-shaped member.

26. The tape holder of claim 25 wherein the slidably and pivotally interrelating means comprises, in combination: longitudinal slots formed on the inside surfaces of the first and second leg portions of the first leg of the first L-shaped member; and detents extending along the end of the first leg of the second L-shaped member which extend into the slots of the first L-shaped member for slidable and pivotable movement therein allowing the first L-shaped member to be slidable and pivotable with respect to the second L-shaped member.

27. The tape holder of claim 26 wherein the interrelating means includes: a series of angular support positions formed on the second leg of the second L-shaped member; and means formed on the first L-shaped member for engaging with the angular support positions for holding the first L-shaped member in any one of several angular positions.

28. The tape holder of claim 27 wherein the angular support positions comprise a series of angular peaks and wherein the engaging means comprises arms extending from the first L-shaped member into the aperture for engaging with and resting in between the angular peaks of the second L-shaped member.

29. The tape holder of claim 28 wherein the series of angular peaks are formed on the top surface of the second leg of the second L-shaped member.

30. The tape holder of claim 28 wherein the second L-shaped member includes apertures formed in the second leg of the second L-shaped member for receiving the arms of the first L-shaped member when the first and second L-shaped members are in the first relationship.

31. The tape holder of claim 19 wherein the interrelating means includes means for slidably and pivotably interrelating the first L-shaped member to the second L-shaped member.

32. A variable position tape holder for holding cassette, 8-track, or video tape boxes comprising, in combination: a first L-shaped member for holding at least one tape box and including first and second legs; a second L-shaped member including first and second legs; and means for interrelating the first and second L-shaped members for supporting the first L-shaped member in any one of several angular positions, wherein the interrelating means includes: a series of angular support positions formed on the second leg of the second L-shaped member; and means immovably attached on the first L-shaped member for engaging with the angular support positions for holding the first L-shaped member in any one of several angular positions.

33. The tape holder of claim 32 wherein the angular support positions comprise a series of angular peaks and wherein the engaging means comprises arms extending from the first L-shaped member which engage with and rest in between the angular peaks of the second L-shaped member.

34. The tape holder of claim 33 wherein the series of angular peaks are formed on the top surface of the second leg of the second L-shaped member.

35. The tape holder of claim 33 wherein the first and second L-shaped members can be interrelated in a first relationship to form an article holder of a single overall outline.

36. A variable position tape holder for holding cassette, 8-track, or video tape boxes comprising, in combination: a first L-shaped member for holding at least one tape box and including first and second legs; wherein the first L-shaped member further includes an L-shaped aperture such that the first leg of the first L-shaped member is U-shaped and includes a central portion and first and second leg portions and the second leg of the first L-shaped member is also U-shaped and includes a central portion and first and second leg portions, with the ends of the leg portions of the first and second legs of the first L-shaped member being joined together forming a corner; a second L-shaped member including first and second legs; and means for interrelating the first and second L-shaped members for supporting the first L-shaped member in any one of several angular positions; wherein the interrelating means includes: a series of angular support positions formed on the second leg of the second L-shaped member; and means formed on the first L-shaped member for engaging with the angular support positions for holding the first L-shaped member in any one of several angular positions; and wherein the angular support positions comprise a series of angular peaks and wherein the engaging means comprises arms extending from the first L-shaped member which engage with and rest in between the angular peaks of the second L-shaped member.

37. The tape holder of claim 36 wherein the arms extend from the ends of the first and second leg portions of the second leg of the first L-shaped member into the aperture along the corner thus giving the second leg of the first L-shaped member a C-shape.

38. In an article holder characterized by a member having at least one surface to support at least one article thereon, the improvement comprising a variable position article holder consisting only of: a first member of an unchanging shape; a second member of an unchanging shape substantially the same as the unchanging shape of the first member; with the first member and the second member having an interfitting relation such that in a first position the first member and the second member interfit to form an article holder of a single outline and in a second position the first member and the second member interfit to have an angular relationship with respect to each other such that one of the first member and the second member forms a base and the other of the first member and the second member forms an article holder and holds articles at any of various angular relationships with respect to the base, and wherein the interfitting relationship between the first member and the second member includes a pivotal and slidable relation.

39. In an article holder characterized by a member having at least one surface to support at least one article thereon, the improvement comprising a variable position article holder consisting only of: a first member of an unchanging shape; a second member of an unchanging shape substantially the same as the unchanging shape of the first member; with the first member and the second member having an interfitting relation such that in a first position the first member and the second member interfit to form an article holder of a single outline and in a second position the first member and the second member interfit to have an angular relationship with respect to each other such that one of the first member and the second member forms a base and the other of the first member and the second member forms an article holder and holds articles at any of various angular relationships with respect to the base, wherein the interfitting relationship includes a plurality of angular support positions formed on the second member and means immovably attached on the first member for engaging with the angular support positions of the second member to thereby position the first member at any one of various angular relationships with respect to the second member.

40. In an article holder characterized by a member having at least one surface to support at least one article thereon, the improvement comprising a variable position article holder comprising: a first member of a first shape and a first outline; a second member of a shape and outline substantially the same as the shape and outline of the first member; with the first member and the second member having an interfitting relation such that in a first position the first member and the second member interfit to form an article holder of a single outline and in a second position the first member and the second member interfit to have an angular relationship with respect to each other such that one of the first member and the second member forms a base and the other of the first member and the second member forms an article holder and holds articles at any of various angular relationships with respect to the base, wherein the first member is generally L-shaped and the second member is generally L-shaped, said single outline being generally L-shaped and the same as the outline of the first or second members.

41. The article holder of claim 40 wherein the interfitting relationship between the first member and the second member includes a pivotal and slidable relation.

42. The article holder of claim 41 or 38 wherein the interfitting relationship includes a plurality of angular support positions formed on the second member and means formed on the first member for engaging with the angular support positions of the second member to thereby position the first member at any one of various angular relationships with respect to the second member.

43. The article holder of claim 42 wherein the angular support positions comprise a series of angular peaks and wherein the engaging means comprises arms extending from the first member which engage with and rest in between the angular peaks of the second member.

44. The article holder of claim 40 wherein the interfitting relationship includes a plurality of angular support positions formed on the second member and means formed on the first member for engaging with the angular support positions of the second member to thereby position the first member at any one of various angular relationships with respect to the second member.

45. The article holder of claim 44 or 39 wherein the angular support positions comprise a series of angular peaks and wherein the engaging means comprises arms extending from the first member which engage with and rest in between the angular peaks of the second member.

* * * * *